United States Patent [19] [11] 3,822,958
Lewis [45] July 9, 1974

[54] MULTISPINDLE DRILLING MACHINE
[75] Inventor: John M. Lewis, Rockford, Ill.
[73] Assignee: Ekstrom, Carlson & Co., Rockford, Ill.
[22] Filed: June 4, 1973
[21] Appl. No.: 366,543

[52] U.S. Cl.............. 408/46, 408/53, 408/99, 408/129, 83/562, 83/700
[51] Int. Cl............................ B23b 39/18
[58] Field of Search........... 408/46, 88, 53, 52, 99, 408/129; 83/700, 560, 562, 620

[56] References Cited
UNITED STATES PATENTS
2,080,643  5/1937  Walther............ 408/46 X
3,682,560  8/1972  Suizi.................. 408/46

Primary Examiner—Gil Weidenfeld
Attorney, Agent, or Firm—Wolfe, Hubbard, Leydig, Voit & Osann, Ltd.

[57] ABSTRACT

Each drilling unit is mounted on a Y-carriage which is supported for adjustment along the Y-axis by an X-carriage. The X-carriages are arranged in two rows and are individually adjustable along the X-axis. The X-carriages are adapted to interleave with one another along the X-axis while the Y-carriages are adapted to interleave with one another along the Y-axis to enable positioning of the drilling units as closely together as possible and in various selected patterns.

16 Claims, 11 Drawing Figures

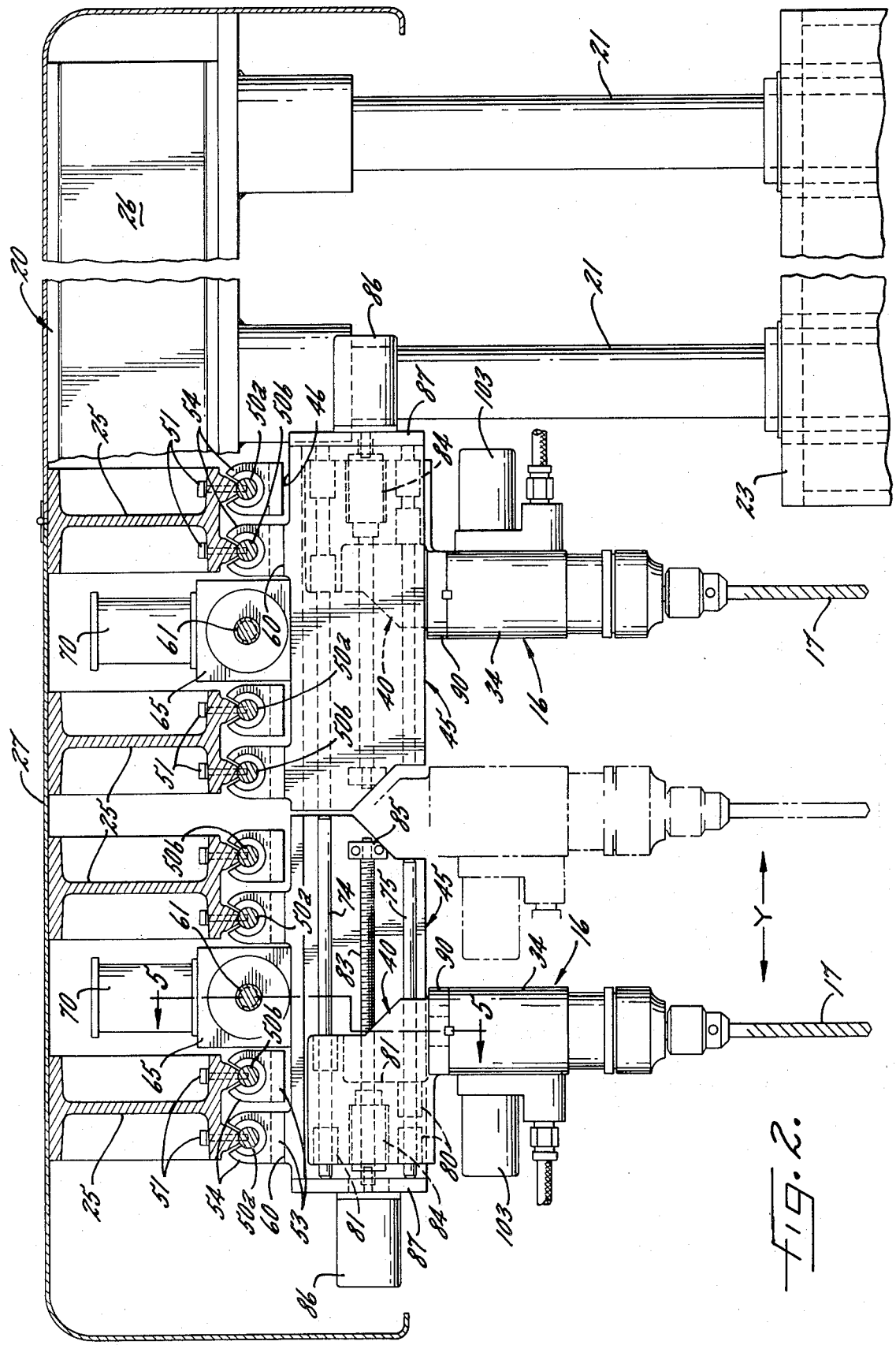

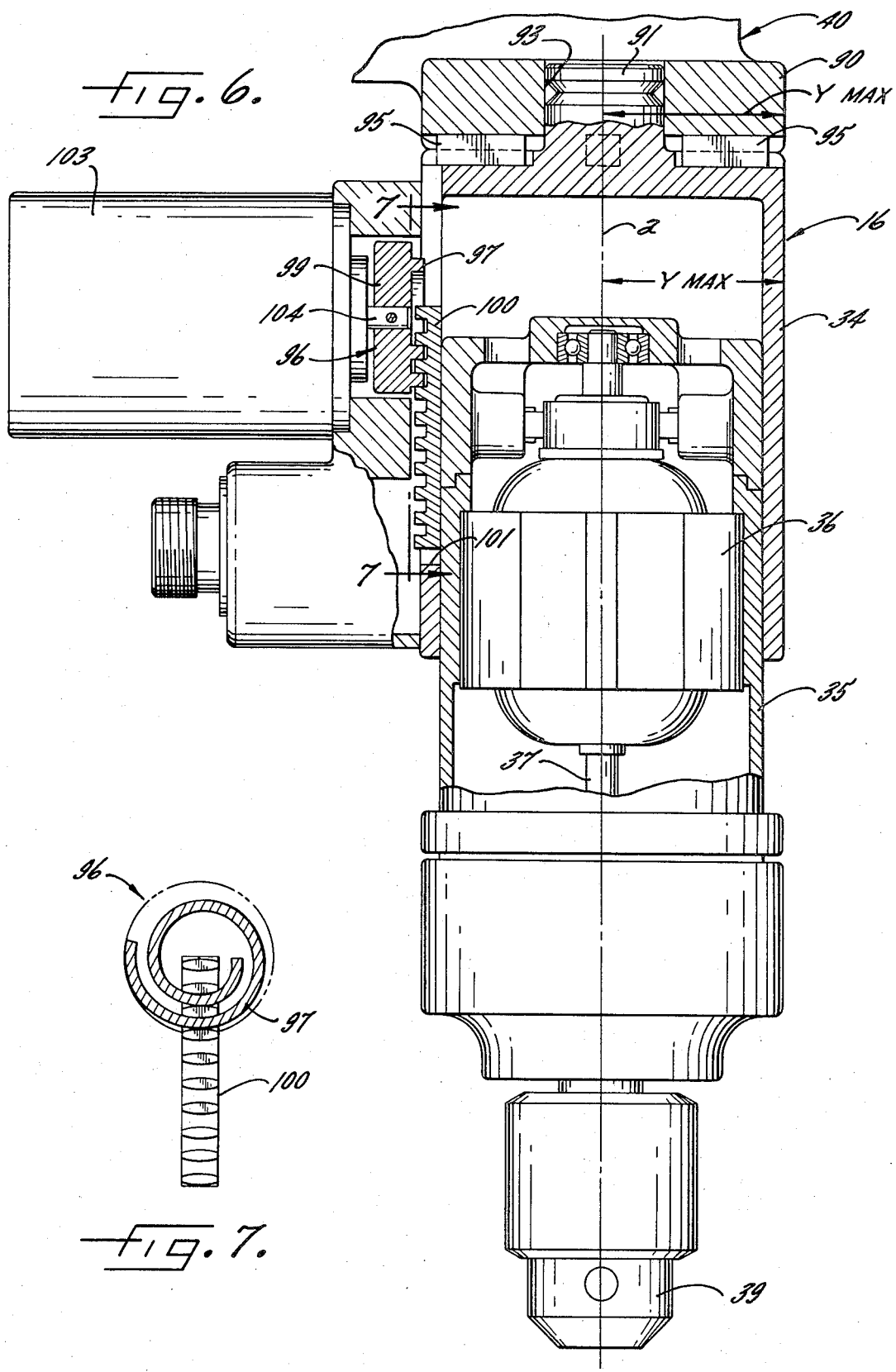

3,822,958

MULTISPINDLE DRILLING MACHINE

BACKGROUND OF THE INVENTION

This invention relates to a machine tool of the type having a multiplicity or gang of tool units which may be adjusted to various positions relative to one another preparatory to machining a workpiece at selected locations determined by the adjusted positions of the tool units. While the invention is applicable to many different types of machine tools with ganged tool units, it finds particularly advantageous use in conjunction with a multispindle drilling machine having a plurality of drilling units carrying power-rotated drilling cutters adapted to form spaced holes in the workpiece.

In such a drilling machine, it is common practice to support the drilling units for adjustment relative to one another along an axis (which conveniently may be called the X-axis) extending transversely of the rotational axes of the drills. The drilling units often are also adjustable relative to each other along a second axis (the Y-axis) which extends perpendicular to the X-axis. In certain drilling machines, the drills may be adjusted relative to each other along still another axis (the Z-axis) peralleling the rotational axes of the drills, and are simultaneously shifted relative to the workpiece to form the holes therein. By adjusting the drilling units along the X and Y-axes, the drills can be positioned to form holes at different locations in the workpiece and, by adjusting the drills along the Z-axis, the holes may be drilled to different selected depths when the drills are brought into engagement with the workpiece. Drilling machines having drills capable of various ones of the above-described adjustments are disclosed in Neitzel U.S. Pat. No. 1,457,387; Walther U.S. Pat. No. 2,080,643; McKnight U.S. Pat. No. 1,858,677 and Suizu U.S. Pat. No. 3,682,560.

SUMMARY OF THE INVENTION

The general aim of the present invention is to provide a new and comparatively rugged and precise machine tool of the above character in which the tool units may be more easily positioned along the X and Y-axes in a larger number of patterns than has been possible heretofore and, at the same time, may be positioned in more closely spaced relationship to enable the performance of machining operations at closely adjacent locations on the workpiece.

A further object is to provide a machine tool in which the tool units may be selectively positioned either in a single row along the X-axis or in a double row along the X-axis with the units of each row paired directly in line with one another along the Y-axis.

Still another object is to provide such a machine tool in which the tool units further may be selectively positioned in a double row along the X-axis with the units of each row paired with one another in extremely closely spaced relationship along a line inclined at an acute angle relative to the Y-axis.

A more detailed object is to achieve the foregoing through the provision of a machine tool in which the tool units are supported for selective positioning along the X-axis by unique carriages which are arranged in a novel manner and which are adapted to interleave compactly with one another to enable the units to be positioned in various different patterns and in closely adjacent relationships.

Another object is to construct the X-carriages in such a manner as to enable the carriages to interleave compactly with one another while still maintaining relatively wide bearing areas between the carriages and the supports along which the carriages move.

Still a further object is to support the tool units for selective positioning along the Y-axis with unique Y-carriages which also are adapted to interleave with one another to enable close positioning of adjacent tool units.

An additional object of the invention is to provide comparatively simple and compact mechanism for adjusting the drills of a multispindle drilling machine along the Z-axis and for locking the drills in their adjusted positions.

These and other objects and advantages of the invention will becomes more apparent from the following detailed description when taken in conjunction with the accompanying drawings.

BRIEF DESCRIPTION OF THE DRAWINGS

FIGS. 2 and 3 are enlarged fragmentary cross-sections taken substantially along the lines 2—2 and 3—3, respectively, of FIG. 1.

FIG. 6 is an enlarged side elevation of one of the tool units, certain parts of the unit being broken away and shown in section.

FIG. 7 is a cross-section taken substantially along the line 7—7 of FIG. 6.

DETAILED DESCRIPTION OF THE PREFERRED EMBODIMENT

Figure 1:
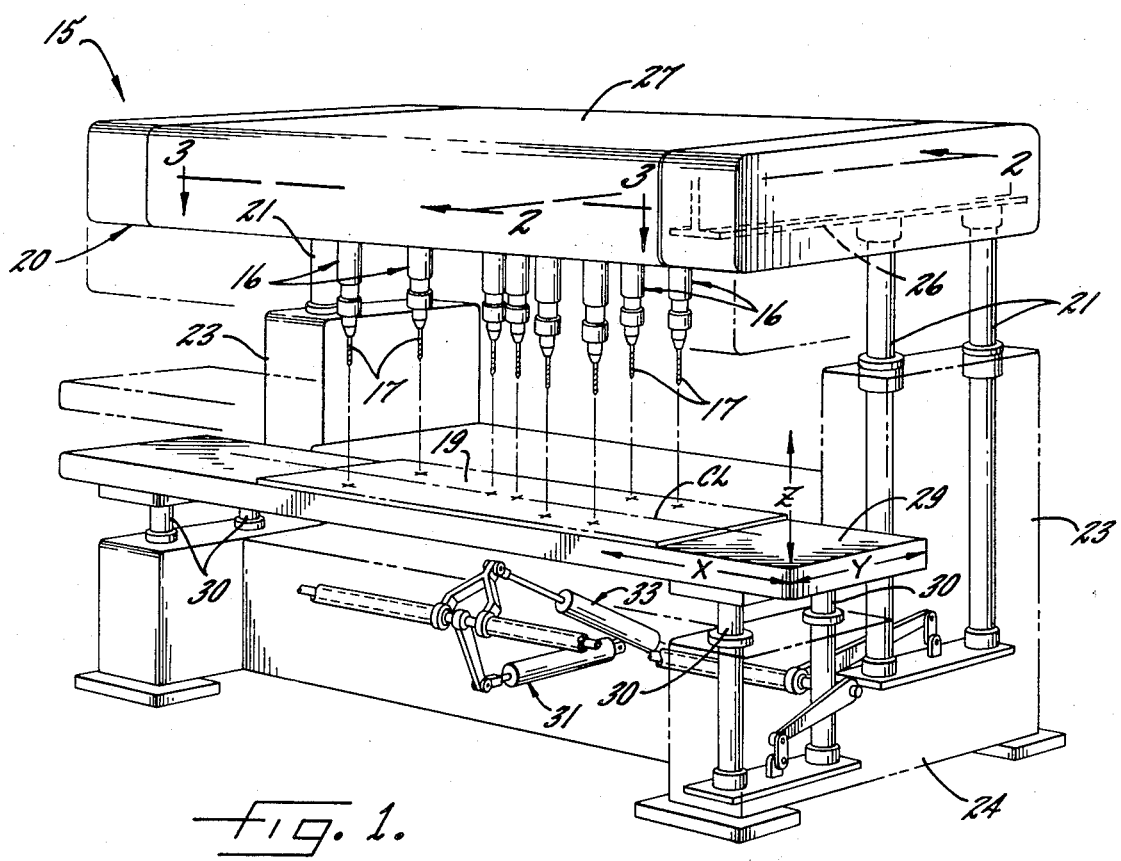
FIG. 1 is a perspective view of a new and improved machine tool incorporating the novel features of the present invention.

For purposes of illustration, the invention is shown in the drawings as incorporated in a machine tool such as a multispindle drilling machine 15 of the type having a gang of tool units 16 each carrying a tool in the form of a drilling cutter 17 adapted to rotate about a vertical axis to drill a hole in an underlying workpiece 19 which herein is shown as being a rectangular board. The drilling units are carried on a vertically reciprocable support or head 20 mounted on upstanding posts 21 which are guided for up and down sliding by a pair of columns 23 located at the ends of the main base 24 of the machine. The head is formed by mutually perpendicular I-beams 25 and 26 (FIG. 2) suitably connected to one another and enclosed by an inverted dish-shaped cover 27.

As shown in FIGS. 1 and 2, the head 20 is cantilevered on the posts 21 in such a manner that the forward portion of the head and the dirlling units 16 supported thereunder project forwardly of the columns 23 and overhang the workpiece 19. The latter is supported on an underlying table 29 (FIG. 1) which is mounted on vertical posts 30 adapted to move upwardly and downwardly on the base 24. By means of a suitable actuating mechanism indicated generally at 31, the table may be raised or lowered to position the workpiece at the proper elevation for drilling of the holes. After the workpiece has been positioned, the head may be shifted downwardly by an actuating mechanism indicated generally at 33, such shifting causing all of the drilling units to move downwardly in unison and to simultaneously drill a gang of holes in the workpiece. In this particular instance, the machine 15 includes eight drilling units and thus it is possible to drill eight holes on each downward stroke of the head.

Each drilling unit 16 comprises a generally cylindrical housing 34 (FIG. 6) into which is telescoped a cylindrical sleeve member 35. The latter encloses and supports a rotary motor 36 whose downwardly projecting output shaft 37 is connected to rotate a chuck 39 for holding the drill 17.

In order to enable drilling of the holes at selected locations in the workpiece 19, each drilling unit 16 is supported on the head 20 for individual adjustment in mutually perpendicular horizontal directions extending along the length and width of the table 29. In addition, each drill 17 preferably may be individually adjusted in a vertical direction to enable adjustment of the depth of the hole formed by that particular drill. To establish a short hand frame of reference for describing the different adjustments and various elements of the machine 15, it will be convenient to refer to the machine as having imaginary X, Y and Z-axes. Herein and as shown in FIG. 1, the X-axis is defined by a horizontal line extending lengthwise of the table, the Y-axis is defined by a perpendicular horizontal line extending across the width of the table, and the Z-axis is defined by a vertical line which parallels the drill. Also, a better understanding of the invention may be gained by considering that the machine includes a working centerline CL (FIG. 1) which parallels the X-axis and extends along the length of the table midway between the front and the rear thereof.

In accordance with the present invention, the drilling units 16 are supported for adjustment along the Y-axis by novel Y-axis carriages 40 which, in turn, are supported for adjustment along the X-axis by new and improved X-axis carriages 45. The latter are uniquely grouped in two rows on opposite sides of the centerline CL and, by virtue of this arrangement and the novel construction of the X and Y-carriages, the drilling units can be positioned extremely close to one another and can be positioned in a greater number of patterns than has been possible heretofore. In spite of the close positioning which is obtainable, the X-carriages 45 are supported on the head 20 in a rugged and stable manner to insure that the drilling units may be moved to and held in precisely established locations relative to the workpiece 19.

One of the important features of the invention resides in the fact that adjacent drills 17 may be positioned as closely together as possible when considering the maximum dimensions of the drilling units 16. In order to fully appreciate this feature and certain ones of the machine elements to be described subsequently, it is important to understand that each drilling unit has maximum dimensions extending in the direction of the X and Y-axes, that is, each unit has a maximum X-dimension and a maximum Y-dimension. The maximum X-dimension of each unit is defined by the diameter of the housing 34 along the X-axis (see FIG. 5) and, in the present instance, is approximately 3 inches. The maximum Y-dimension of each unit should be considered to be the dimension extending along the Y-axis from the axis $a$ of the drill 17 to the inboard side of the housing, i.e., the side of the housing closest to the centerline CL (see FIG. 6). Herein, the maximum Y-dimension of each unit is about 1½. With the maximum X and Y-dimensions having the specified values, each drill may be positioned within 3 inches from an adjacent drill. Closer spacing of the drills simply is not possible because of the inherent interference between the housings of adjacent drilling units.

Figure 3:
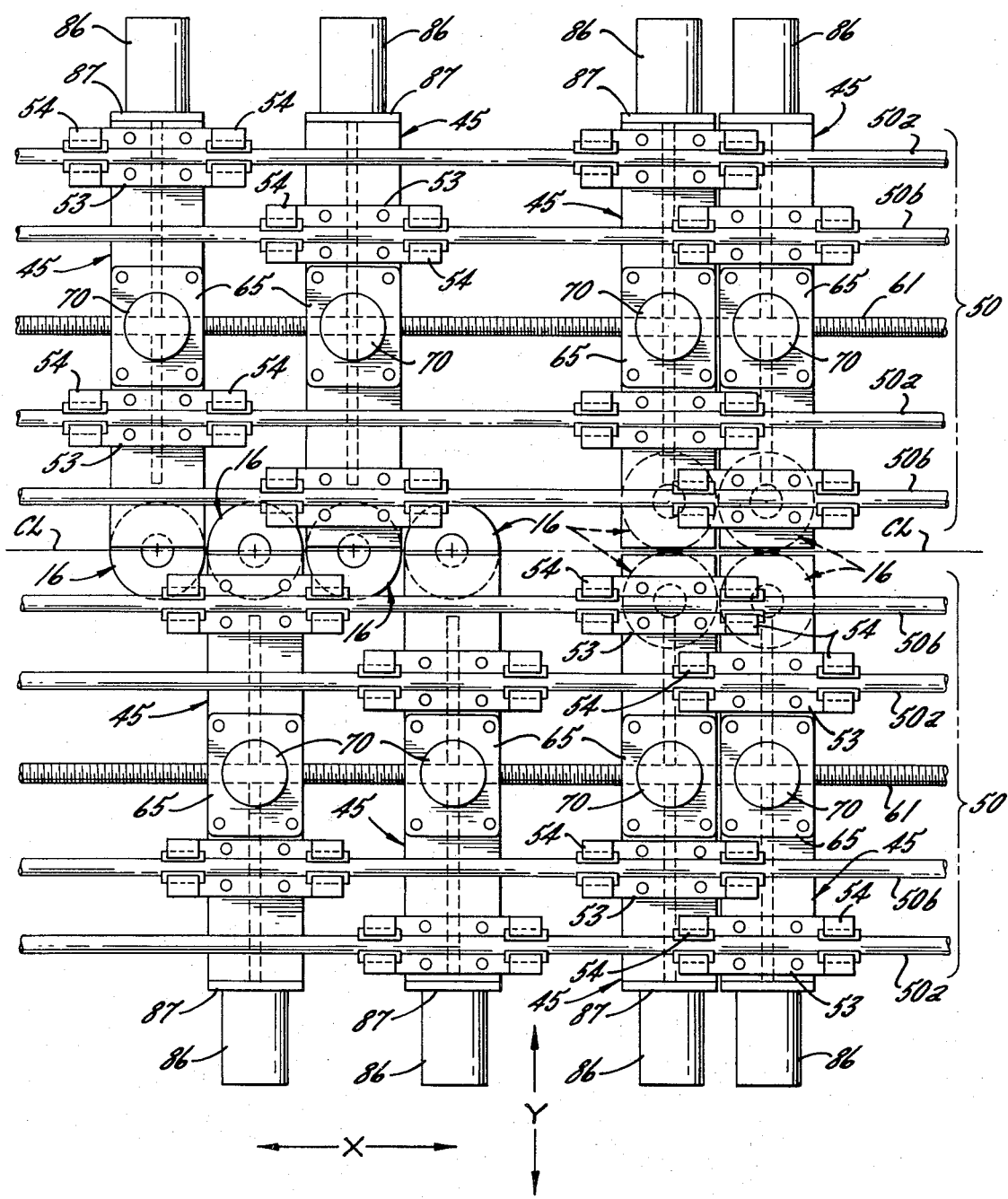

Turning now to the X-carriages 45, it will be seen in FIG. 3 that four carriages are arranged in each of two rows located on opposite sides of the centerline CL. Each carriage includes a generally L-shaped casting having a substantially rectangular top member or plate 46 (see FIGS. 4 and 5) and an upright side plate 47 which depends from one of the long margins of the top plate. The carriages are oriented with their long margins extending in the direction of the Y-axis and are positioned with their inboard ends located just short of the centerline CL (see FIG. 3).

The drilling units 16 are mounted beneath the X-carriages 45, and the latter are supported for movement along the X-axis to enable adjustment of the X-axis spacing between the units. Importantly, the maximum X-dimension of the top plate 46 of each carriage is no greater than and is preferably equal to the maximum X-dimension of the underlying drilling unit, the top plates thus having a maximum X-dimension of three inches (see FIG. 5). As a result, the top plates do not project beyond the drilling units along the X-axis and hence do not interfere with obtaining the closest possible side-by-side positioning of the units.

Supporting the X-carriages 45 for movement along the X-axis are two groups of cylindrical guide rods 50 (FIG. 3) which extend in the direction of the X-axis and which are connected at spaced points to the I-beams 25 by means of screws 51 (FIG. 2). One group of rods overlies each row of X-carriages. In furtherance of the invention, each group of rods is defined by a first pair of horizontally spaced rods 50a and a second pair of horizontally spaced rods 50b which alternate with the rods 50a along the Y-axis so that the progression follows the sequence of 50a, 50b, 50a, 50b. The spacing between the outboard rods 50a and 50b is equal to the spacing between the inboard rods 50a and 50b, and the X-carriages are generally centered beneath the rods along the Y-axis. As will become more apparent subsequently, alternate X-carriages in each row are supported on the rods 50a while the other two carriages in the row are supported on the rods 50b.

To support the X-carriages 45 on the rods 50, two elongated bearing arms 53 (FIG. 4) are secured to the top plate 46 of each carriage and are spaced from one another along the Y-axis. Tubular ears 54 upstand from the ends of each arm and carry bearings or bushings 55 which are telescoped slidably over the rods to support the carriages on and for movement along the rods.

Importantly, each bearing arm 53 has an X-dimension (FIG. 4) which is considerably greater than the maximum X-dimension of the top plate 46 of the underlying X-carriage 45. In this instance, the X-dimension of each arm is 6 inches and each is centered above the top plate of its underlying carriage along the Y-axis so that the ears 54 and the bearings 55 at the ends of the arms project laterally beyond the sides of the top plate. As a result, there is approximately a 6- inch span between the outer ends of each pair of bearings and thus each carriage is supported on the rods 50 in a stable manner by relatively widespread bearing areas in spite of the comparatively narrow X-dimension of the top plate 46. The carriages thus are less likely to become loose on the rods or to assume cocked positions and hence may be positioned more accurately along the rods and with greater assurance that such accurate positioning will be maintained when the head 20 is shifted downwardly to bring the drills 17 into engagement with the workpiece 19.

Figure 4:
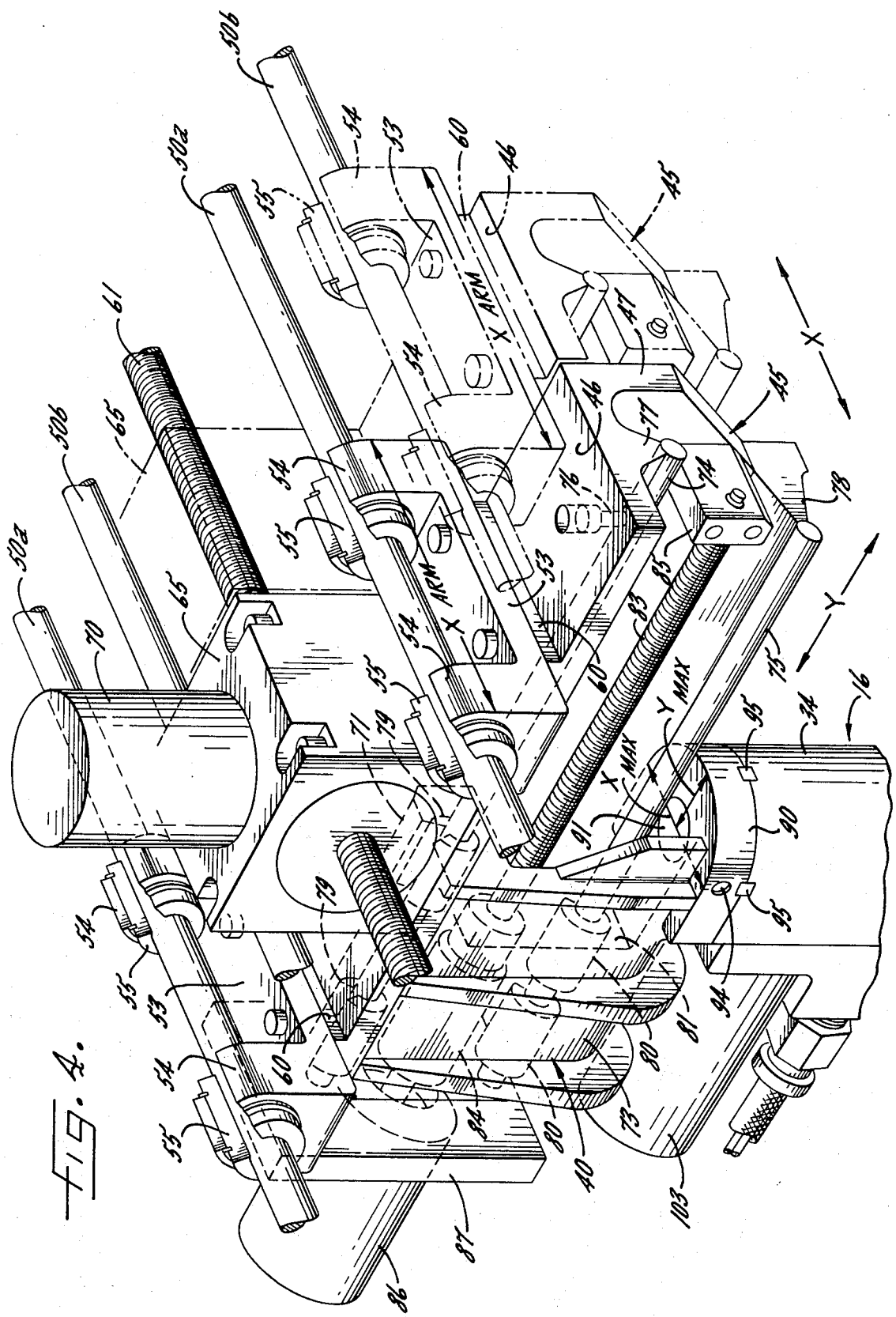
FIG. 4 is an enlarged fragmentary perspective view of parts shown in FIGS. 2 and 3.

In carrying out the invention, the top plates 46 of the X-carriages 45 in each row may be positioned directly adjacent one another in spite of the laterally projecting bearing arms 53 and thus the drills 17 may be positioned as closely together as possible along the X-axis (see FIGS. 3 and 4). For this purpose, the bearing arms 53 of adjacent carriages in each row are staggered relative to one another along the Y-axis such that the arms of each carriage may interleave with the arms of the adjacent carriage or carriages and may overlap the adjacent top plate or plates to enable the top plates to be positioned directly alongside of one another. As shown in FIGS. 2 and 4, the bearing arms are secured to raised mounting pads 60 cast on the upper surface of each top plate 46. The mounting pads of adjacent carriages are staggered relative to one another (see FIG. 4), and the upper surface of each pad is located above the upper surface of the adjacent top plate. Thus, when attached to the pads, the arms of adjacent carriages are staggered, and the lower surfaces of the outwardly projecting ends of the arms are spaced above the adjacent top plate or plates.

The X-carriages 45 of each row are attached to the guide rods 50 with the bearing arms 53 of alternate carriages secured to one pair of rods 50a and with the bearing arms of the other two carriages secured to the other pair of rods 50b. Accordingly, when the top plates 46 of two carriages are positioned directly adjacent one another as exemplified by the two carriages shown at the lower right in FIG. 3, the arms 53 of each carriage may overlap the top plate of the other carriage and may interleave with the arms of the other carriage to enable close side-by-side positioning of the top plates and the drilling units 16 without interference from the arms (see FIGS. 3 and 4). If the carriage to the left of the right-hand pair were adjusted to the right, its arms also could overlap the adjacent top plate and thus the top plates of all four carriages in each row may be positioned directly adjacent one another even in spite of the presence of the relatively long arms which enable the carriages to be suspended from the rods 50 in a more stable manner.

Figure 5:
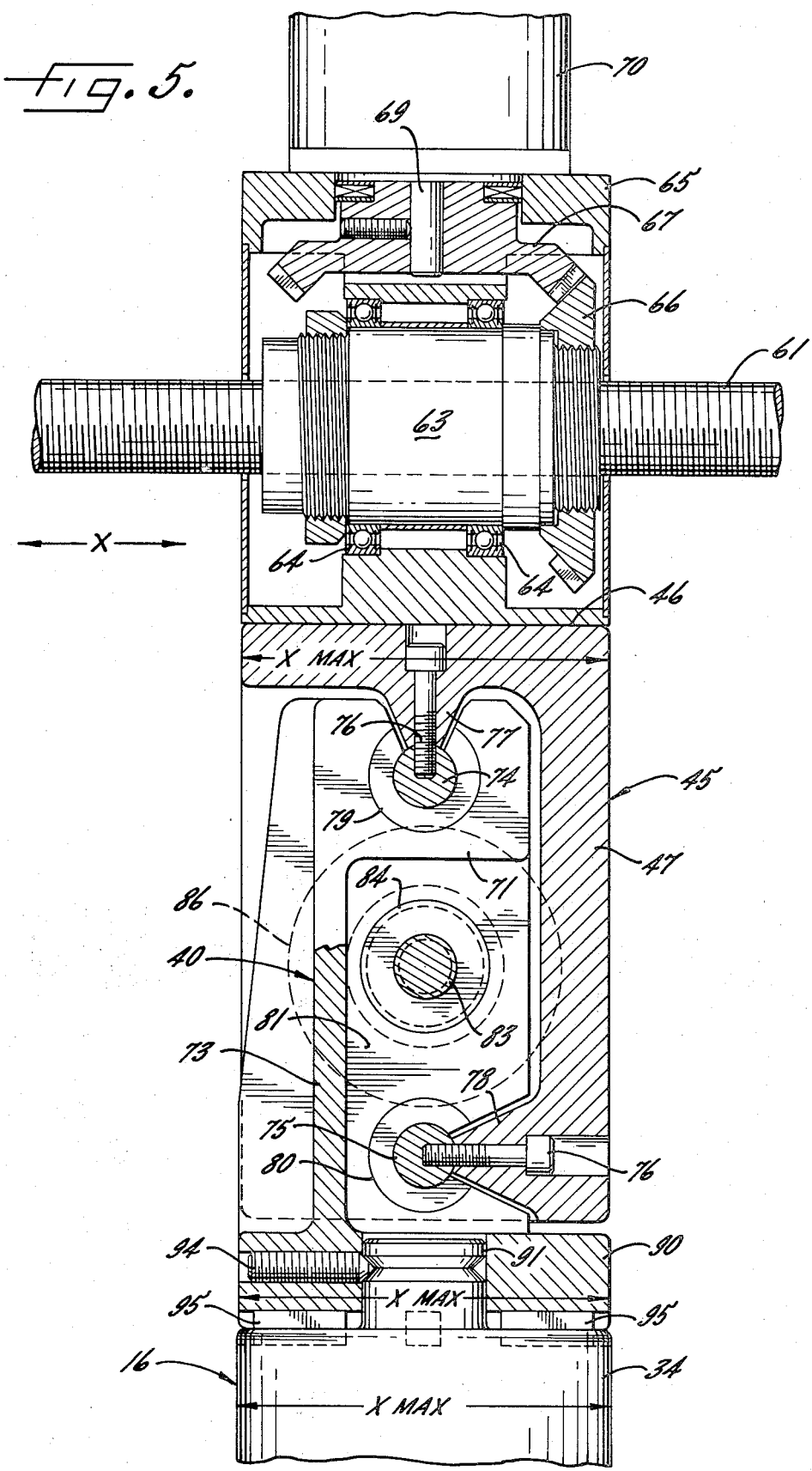
FIG. 5 is an enlarged fragmentary cross-section taken substantially along the line 5—5 of FIG. 2.

To enable adjustment of the X-carriages 45 along the X-axis, a lead screw 61 (FIGS. 3 to 5) is located midway between and extends parallel to the second and third rods 50b and 50a of each group and is secured rigidly at its ends to the ends of the head 20. Each X-carriage supports a rotatable nut 63 (FIG. 5) which is threaded onto the stationary screw and which is adapted to be power-rotated in either direction so as to move the carriage back and forth along the guide rods 50. As shown in FIG. 5, the nut 63 of each carriage is journaled by bearings 64 within a box-like housing 65 anchored to the top plate 46 of the carriage. A bevel gear 66 is anchored to one end of the nut 63 while a second bevel gear 67 is attached to the rotatable drive shaft 69 of a reversible stepping motor 70 supported on the upper side of the housing. Electrical pulses are applied to the windings of the motor under the control of a punched tape or a minicomputer and cause the shaft 69 to step either forwardly or reversely through a sufficient distance to move the X-carriage along the X-axis to a position which may be programmed according to the location in which it is desired to drill a hole in the workpiece 19. Thus, the X-carriages all may be individually located in predetermined positions under automatic control before the heat 20 is shifted downwardly to effect drilling of the holes.

It should be pointed out that each lead screw 61 is approximately 100 inches long and that the only direct connections between the screw and the head 20 are at the ends of the screw. Nevertheless, the screws do not sag or deflect downwardly by any appreciable degree since they are supported intermediate their ends by the nuts 63 which, in turn, are suspended from the rigidly mounted guide rods 50.

As mentioned above, the drilling units 16 are supported on the Y-carriages 40 which, in turn, are mounted on the X-carriages 45. Herein, each Y-carriage is formed by a casting having a generally horizontal top wall 71 (FIG. 5) underlying the top plate 46 of the associated X-carriage and having a depending side wall 73 extending parallel to and spaced laterally from the side plate 47 of the X-carriage so that an opening or space is defined between the side and the side wall. To support the Y-carriage for movement along the Y-axis, vertically spaced guide rods 74 and 75 (FIGS. 4 and 5) extend in the direction of the Y-axis and are anchored by screws 76 to V-shaped ribs 77 and 78 cast integrally with the top and side plates 46 and 47, respectively, of the X-carriage. Two bushings 79 (FIG. 4) are carried by the top wall 71 and are telescoped slidably over the upper guide rod 74. Two additional bushings 80 are telescoped slidably over the lower guide rod 75 and are supported within a solid metal block 81 (FIG. 5) cast integrally with the outboard end portions of the top and side walls 71 and 73 and substantially filling in the space at the outboard end portion of the Y-carriage 40. As a result of the rugged support provided by the four bushings, the Y-carriage will remain precisely in any position to which it is moved along the guide rods 74 and 75.

Movement of each Y-carriage 40 along its associated guide rods 74 and 75 is effected in response to rotation of a lead screw 83 (FIGS. 4 and 5) extending parallel to and located midway between the guide rods, the lead screw being threaded into a non-rotatable nut 84 which is anchored within the block 81 of the Y-carriage. At its inner end, the screw is rotatably journaled by a bracket 85 (FIG. 4) attached to the inboard end portion of the side plate 47 of the X-carriage 45. The outboard end of the screw is connected to the drive shaft of a reversible stepping motor 86 which is supported on the outer side of a vertical plate 87 attached to the outer ends of the top and side plates 46 and 47 of the X-carriage. The Y-motors 86 are controlled automatically in the same fashion as the X-motors 70 and, as each screw 83 is turned by its associated Y-motor, the Y-carriage 40 is moved inwardly or outwardly along the guide rods 74 and 75 to adjust the position of the drilling units 16 along the Y-axis.

In keeping with the principles of the invention, each Y-carriage 40 supports its respective drilling unit 16 by means of a unique mounting pad 90 (FIGS. 4 and 5) whose maximum X and Y-dimensions are no greater than and are preferably equal to the maximum X and Y-dimensions of the drilling unit in order to support the latter in a rugged manner without interfering with the closest possible positioning of the drilling units. As shown in FIG. 4, each mounting pad 90 is cast integrally with the lower end of the inboard end portion of the side wall 73 and projects inwardly from the side wall so as to define the innermost extremity of the Y-carriage 40. A shank 91 (FIG. 6) on the upper end of the housing 34 of the drilling unit projects into a hole 93 in the pad and is secured thereto by angularly spaced and radially extending set screws 94 (FIG. 4) threaded into the pad. In addition, four radially extending keys 95 are fitted into keyways in the pad and the housing and prevent the housing from turning relative to the pad.

The mounting pad 90 is generally U-shaped when viewed from above (see FIG. 4), and corresponds exactly in size and shape to the size and shape of the housing 34. Importantly, the bight or bridge of the U faces inwardly and defines a semi-circle which is curved arcuately about the axis $a$ of the drill 17, such axis coinciding with the axis of the shank 91. As will become more apparent subsequently, the rounded configuration of the inner end portion of the mounting pad 90 and the corresponding configuration of the underlying housing 34 contribute toward enabling location of the drilling units 16 in different selected patterns and with the closest possible positioning.

In order to enable adjustment of the drills 17 along the Z-axis for the purpose of establishing the depth of the holes, each sleeve 35 (FIG. 6) is mounted for up and down sliding within its respective housing 34. Comparatively simple and compact means are provided for adjusting the sleeve upwardly and downwardly and for locking the sleeve in its adjusted position. Herein, these means comprise a rotatable scroll plate 96 (FIGS. 6 and 7) which is formed by a spiral ring 97 located on one side of a circular disc 99 and defining a continuous spiraled tooth. the ring is adapted to mesh with the teeth of a rack 100 anchored to the sleeve 35 and projecting outwardly through a slot 101 (FIG. 6) in the outboard side of the housing 34. When the scroll plate 96 is rotated, the ring 97 forces the rack 100 to reciprocate upwardly and downwardly and thus slides the sleeve within the housing to adjust the position of the drill 17 along the Z-axis. The mechanism is irreversible, however, in that an upward force applied to the rack is ineffective to rotate the scroll plate and hence the drill remains rigidly locked in its adjusted position. While the scroll plate could be rotated by means of a manual adjustment mechanism, the present machine 15 employs an automatically controlled stepping motor 103 which is attached to the side of the housing 34 and whose drive shaft 104 is connected to the scroll plate.

As shown in FIGS. 2 and 3, the X-carriages 45 of one row are turned end-for-end with respect to the X-carriages of the other row and thus all of the Y-motors 86 are located outboard or away from the centerline CL and will not interfere with close positioning of the drilling units 16. Similarly, the four Y-carriages 40 associated with one row of X-carriages are turned end-for-end with respect to the remaining four Y-carriages to locate all of the Z-motors 103 on the outboard sides of the drilling units and to cause all of the rounded mounting pads 90 to face the centerline CL. With the various carriages so arranged, the drills 17 may be positioned in any of the exemplary patterns shown in FIGS. 8 to 11 simply by adjusting the carriages 40 and 45 along the X and Y-axes with the X and Y-motors 70 and 86.

Figures 8, 9:
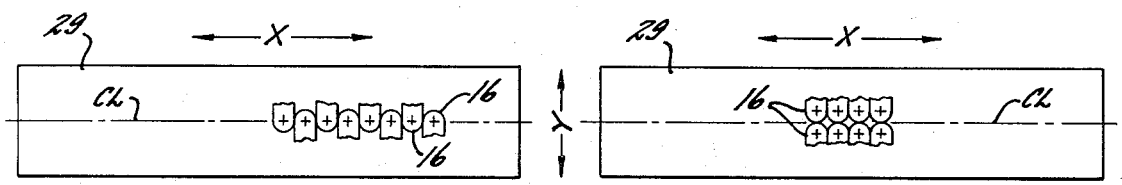
FIGS. 8 to 11 are diagrams showing various exemplary patterns in which the tool units may be positioned.

FIG. 8 shows all eight drills 17 positioned in a single row extending along the centerline CL, the drills being positioned as closely as possible and thus being located within 3 inches of one another. Such positioning is achieved by adjusting the X-carriages 45 of the front row so that they are located between the X-carriages of the rear row (as exemplified by the four left-hand carriages shown in FIG. 3) and by adjusting each Y-carriage 40 inwardly as far as possible on its associated X-carriage. With the carriages thus positioned, the mounting pads 90 of the front carriages alternate and interleave with the mounting pads of the rear carriages across the centerline CL to enable the axes $a$ of the drills to lie in a single row along the centerline. Because the X-dimension of each mounting pad 90 is no greater than the maximum X-dimension of the underlying drilling unit 16, the drills may be located within 3 inches of one another along the centerline.

In FIG. 9, the four drills 17 of the front row are shown as paired with the drills of the rear row with the drills of each pair being directly in line with one another along the Y-axis. The drills of each pair are spaced 3 inches from one another along the Y-axis, and the same spacing exists along the X-axis between the drills of each row. To position the drills in this manner, the X-carriages 45 are moved as closely together as possible (see the four right-hand carriages shown in FIG. 3) and the Y-carriages 40 are located with the innermost ends of the mounting pads 90 positioned exactly on the centerline CL. When the X-carriages are thus positioned, the bearing arms 53 of each carriage overlap the top plates 46 of the adjacent carriages and interleave with the arms of the adjacent carriages to permit adjacent drills to be located within 3 inches from one another along the X-axis even though the X-dimension of each arm is greater than the maximum X-dimension of the drilling unit 16. Because the Y-dimension of each mounting pad 90 is no greater than the maximum Y-dimension of the drilling unit, opposing drills may be located within 3 inches of one another along the Y-axis.

Figures 10, 11:
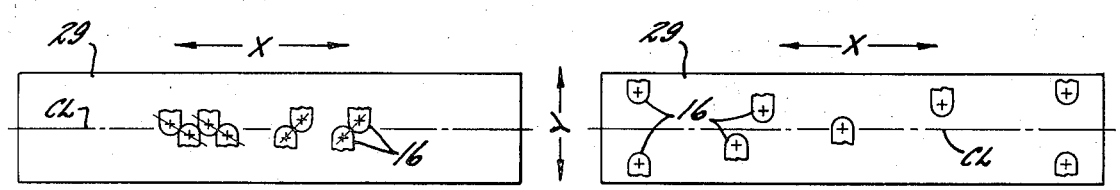

It is also possible to pair the drills 17 of each row along lines inclined at acute angles relative to the centerline CL while still maintaining a 3-inch spacing between the drills of each pair. Such positioning is shown in FIG. 10 and is made possible by virtue of the rounded inner ends of the mounting pads 90. Because of the rounded ends, each mounting pad may be located tangent to the opposing mounting pad and, by adjusting the X and Y-carriages 45 and 40, the opposing drills can be located at virtually any angle relative to one another without increasing the 3-inch spacing between the drills.

FIG. 11 illustrates just one of many random patterns in which the drills 17 may be positioned. As shown, one drill is located at each of the four corners of the work table 29 while the remaining four drills are positioned at random locations. The drills may be positioned in almost any pattern with virtually the only limitations being that no drill may cross the centerline CL and no drill may be located directly behind another on the same side of the centerline.

A further advantage of the invention is that all eight of the Y-carriages 40 are identical to one another and all eight of the X-carriages 45 are virtually identical to one another so as to simplify manufacture of the carriages. Thus, all of the Y-carriages 40 are formed from identical castings. As cast, all the X-carriages 45 are identical and each is formed with four raised mounting pads 60 (FIG. 4) for the bearing arms 53. The two unused pads on each X-carriage then are machined down to provide vertical clearance for the arms of the adjacent carriage to overlap the top plate 46. The first and third pads are machined down on half of the X-carriages while the second and fourth pads are machined down on the remaining four carriages.

I claim as my invention:

1. In a machine tool of the type having imaginary X and Y axes extending in mutually perpendicular horizontal directions, said machine tool comprising a support, two horizontally spaced pairs of horizontally spaced horizontal guide rods mounted stationarily on said support and extending along said X-axis, the rods of one pair alternating with the rods of the other pair along said Y-axis, a row of X-carriages movable relative to said rods and along said X-axis, a tool unit depending from each of said carriages and having a predetermined maximum X-dimension extending along said X-axis, means for individually moving each carriage along said X-axis thereby to enable adjustment of the X-axis spacing between said tool units, each of said carriages comprising a member having a maximum X-dimension no greater than the maximum X-dimension of the associated tool unit and having an upwardly facing surface located beneath said rods, first and second arms joined to each carriage member and spaced from one another along said Y-axis, each of said arms having an X-dimension greater than the maximum X-dimensions of the associated tool unit and carriage member and being substantially centered relative to its carriage member along said X-axis whereby the end portions of the arm project beyond the carriage member along said X-axis, the projecting end portions of said arms having downwardly facing surfaces located no lower than said upwardly facing surface of said carriage member, bearings carried by the projecting end portions of said arms and telescoped over said rods to connect said arms to said rods and support said carriages on and for movement along the rods, and the first and second arms of each carriage being staggered along said Y-axis relative to the first and second arms, respectively, of an adjacent carriage and being connected to a different pair of rods than the arms of the adjacent carriage thereby to permit the arms of each carriage to overlap the upwardly facing surface of the adjacent carriage member along said X-axis and enable said tool units to be positioned in close side-by-side relation.

2. In a machine tool of the type having imaginary X, Y and Z axes extending mutually perpendicular to one another, said machine tool comprising a support, two pairs of elongated guides mounted stationarily on said support and extending along said X-axis, the guides of one pair being spaced from and alternating with the guides of the other pair along said Y-axis, a row of X-carriages movable relative to said guides along said X-axis, a tool unit mounted on each of said carriages and having a predetermined maximum X-dimension extending along said X-axis, means for individually moving each carriage along said X-axis thereby to enable adjustment of the X-axis spacing between said tool units, each of said carriages comprising a member having a maximum X-dimension no greater than the maximum X-dimension of the associated tool unit, first and second arms joined to each carriage member and spaced from one another along said Y-axis, each of said arms having an X-dimension greater than the maximum X-dimensions of the associated tool unit and carriage member and being substantially centered relative to its carriage member along said X-axis whereby the end portions of the arm project beyond the carriage member along said X-axis, the arms of each carriage being connected at their ends to a pair of said guides to support the carriage on and for movement along such guides, and the first and second arms of each carriage being staggered along said Y-axis relative to the first and second arms, respectively, of an adjacent carriage and being connected to a different pair of guides than the arms of the adjacent carriage thereby to permit the arms of each carriage to overlap the adjacent carriage member along said X-axis and enable said tool units to be positioned in close side-by-side relation.

3. A machine tool as defined in claim 2 in which said guides comprise cylindrical rods, and bearings carried by the end portions of said arms and telescoped over said rods to mount said carriages slidably on the rods.

4. A machine tool as defined in claim 3 in which said means comprises a lead screw mounted stationarily on said support and extending parallel to said rods, a nut rotatably supported by each carriage and threaded onto said screw, and a reversible motor supported on each carriage and operable to rotate the associated nut.

5. A machine tool as defined in claim 4 in which first, second, third and fourth rods are spaced consecutively along said Y-axis with the first and third rods defining the guides of one pair and with the second and fourth rods defining the guides of the other pair, the spacing between said first and second rods being equal to the spacing between said third and fourth rods, and said lead screw being located midway between said second and third rods.

6. A machine tool as defined in claim 2 in which a second row of X-carriages is spaced from said first row along said Y-axis, the carriages of said second row being substantially identical to the carriages of said first row and being mounted on said support in a manner substantially identical to the mounting of the carriages of said first row, the carriages of said second row being turned end-for-end with respect to the carriages of said first row.

7. A machine tool as defined in claim 6 further including first second Y-carriages secured to the X-carriages of said first and second rows, respectively, actuating means for individually moving each Y-carriage relative to its X-carriage and along said Y-axis, there being one tool unit movable along said Y-axis with each Y-carriage and extending generally along said Z-axis, and means on the inboard end of each Y-carriage for supporting the associated tool unit on and for movement with the Y-carriage.

8. A machine tool as defined in claim 7 in which each of said actuating means comprises a lead screw journaled rotatably by each X-carriage and extending along said Y-axis, a reversible motor supported on the outboard end of each X-carriage and connected to rotate said lead screw, and a nut supported non-rotatably by each Y-carriage and threaded onto the associated lead screw.

9. A machine tool as defined in claim 7 in which said last-mentioned means comprise a mounting pad joined to the inboard end of each Y-carriage and connected to said tool unit, said mounting pad having a maximum X-dimension no greater than the maximum X-dimension of said tool unit.

10. A machine tool as defined in claim 9 in which each tool unit includes a housing and further includes an elongated tool projecting from said housing and extending in the direction of said Z-axis, the inboard side of each housing and the inboard side of each pad facing in the direction of said Y-axis and being curved about a center located substantially on the axis of said tool.

11. A machine tool as defined in claim 10 in which the inboard side of said pad projects no further inwardly than the inboard side of said housing.

12. A machine tool as defined in claim 2 in which each tool unit includes a housiing and further includes an elongated tool projecting from said housing and extending in the direction of said Z-axis, a member connecting said tool to said housing for adjustment of the tool relative to said housing and along said Z-axis, and means for adjusting said tool along said Z-axis, said adjusting means comprising a toothed rack secured to said member, and a scroll plate rotatably mounted on said housing and meshing with said rack.

13. In a machine tool of the type having imaginary X, Y and Z axes extending mutually perpendicular to one another and having an imaginary centerline extending parallel to said X-axis, said machine tool comprising a support, two rows of X-carriages spaced from one another along said Y-axis and disposed on opposite sides of said centerline, said carriages being mounted on said support for movement along coplanar paths extending parallel to said X-axis, means for individually moving each carriage back and forth along its respective path thereby to enable adjustment of the X-axis spacing between the carriages in each row, a Y-carriage mounted on each X-carriage for movement with the latter and also for movement relative to the X-carriage along a path extending in the direction of said Y-axis, actuating means for individually moving each Y-carriage back and forth relative to its associated X-carriage, each of said Y-carriages having an inboard end located adjacent said centerline and having an opposite outboard end spaced along said Y-axis from said inboard end, a tool unit mounted on the inboard end of each Y-carriage, each of said tool units having a central axis extending generally in the direction of said Z-axis, having an inboard end located adjacent said centerline and having an outboard end spaced along said Y-axis from said inboard end, each of said tool units having a predetermined maximum X-dimension extending in the direction of said X-axis and having a predetermined maximum Y-dimension extending in the direction of said Y-axis from said central axis to the inboard end of the tool unit, each of said Y-carriages including a pad supporting the respective tool unit and having a maximum X-dimension no greater than the maximum X-dimension of the tool unit thereby to enable positioning of all of said tool units in a single row extending in the direction of said X-axis with the central axes of the tool units alined with one another along said centerline and with the central axes of adjacent units spaced from one another in the direction of said X-axis by a distance substantially equal to the maximum X-dimension of one of said tool units, and each of said pads having a maximum Y-dimension from said central axis to the inboard end of the pad no greater than the maximum Y-dimension of said tool unit thereby to permit positioning of the tool units of the X-carriages of one row directly opposite from the tool units of the X-carriages of the other row with the central axes of opposing tool units disposed in a common plane extending parallel to said Y-axis and spaced from one another by a distance substantially equal to twice the maximum Y-dimension of one of said tool units.

14. A machine tool as defined in claim 13 further including two pairs of guide rods mounted stationarily on said support and extending along said X-axis, the rods of one pair being spaced from and alternating with the rods of the other pair along said Y-axis, each of said X-axis carriages comprising a member having a maximum X-dimension no greater than the maximum X-dimension of the associated tool unit, first and second arms joined to each of said carriage members and spaced from one another along said Y-axis, each of said arms having an X-dimension greater than the maximum X-dimensions of the associated tool unit and carriage member and being substantially centered relative to its carriage member along said X-axis whereby the end portions of the arm project outwardly beyond the carriage member along said X-axis, bearings carried by said outwardly projecting end portions of said arms and telescoped over said rods to connect said arms to said rods and support said X-axis carriages on and for movement along the rods, and the first and second arms of each X-axis carriage being staggered along said Y-axis relative to the first and second arms, respectively, of an adjacent X-axis carriage and being connected to a different pair of rods than the arms of the adjacent carriage.

15. A machine tool as defined in claim 13 in which each of said actuating means comprises a lead screw journaled rotatably by each X-carriage and extending along said Y-axis, a reversible motor supported on the outboard end of each X-carriage and connected to rotate said lead screw, and a nut supported non-rotatably by each Y-carriage and threaded onto the associated lead screw.

16. In a machine tool, the combination of, a support, a row of first X-carriages mounted on said support for movement along a first linear path, a row of second X-carriages mounted on said support for movement along a second and parallel path, means for individually moving each carriage along its respective path thereby to enable adjustment of the spacing between the carriages in each row, a Y-carriage mounted on each X-carriage for movement with the latter and also for movement relative to the X-carriage along a path extending perpendicular to said first and second paths, means for individually moving each Y-carriage along its perpendicular path, a tool unit associated with each of said Y-carriages and extending generally perpendicular to all of said paths, and means on said Y-carriages supporting said tool units and permitting positioning of all of said tool units in a single row extending parallel to said first and second paths with the tool units associated with said first X-carriages alternating along said single row with the tool units associated with said second X-carriages.

* * * * *